Aug. 4, 1942.  A. D. GARRISON  2,292,267
PREPARATION OF DRILLING MUDS
Filed July 7, 1937
COMPARATIVE VISCOSITY-REDUCING EFFECTS OF GLASSES PREPARED
BY FLUXING $NaH_2PO_4$ AND BORAX AND SHOCK-CHILLING
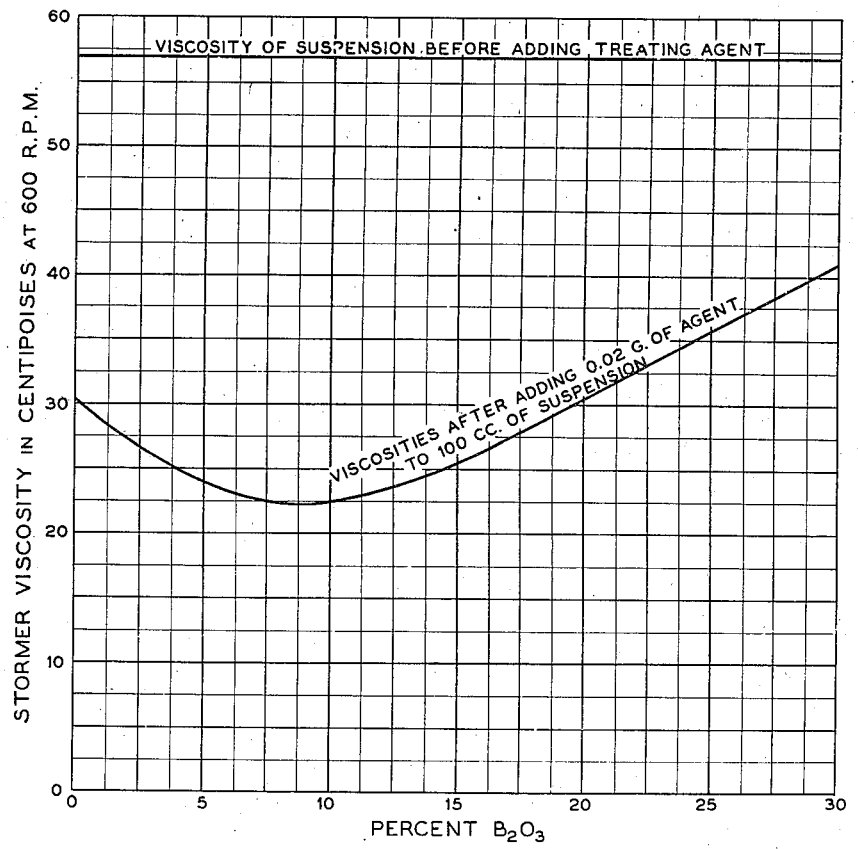
ALLEN D. GARRISON
INVENTOR
BY
ATTORNEY

UNITED STATES PATENT OFFICE 2,292,267

PREPARATION OF DRILLING MUDS

Allen D. Garrison, Houston, Tex., assignor, by mesne assignments, to The Texas Company, New York, N. Y., a corporation of Delaware Application July 7, 1937, Serial No. 152,463

17 Claims. (Cl. 252—8.5)

This invention relates to drilling muds and more particularly to the preparation of drilling muds employed in the drilling of wells.

More specifically, my invention relates to a method of controlling the colloidal and physical properties of a drilling mud so as to maintain it in the most desirable condition for use and which comprises adding to the drilling mud a water-soluble composition of an alkali metal with phosphorus, boron and oxygen.

Drilling muds are used in the drilling of wells employed for tapping underground collections of oil, gases, brines or water. These muds fulfill various functions, the most important of which are to assist in removal of cuttings from the well, to seal off formations of gas, oil and water which may be encountered at various levels, and to lubricate the drilling tube and the drill pipe which carry the tools.

Drilling muds are essentially mixtures of finely divided solids, such as clay with water, usually so compounded that they weigh from eight to twelve pounds per gallon. Whenever it is found necessary to increase the specific gravity of a particular mud it is customary to add thereto finely divided materials which have a high specific gravity, such, for example, as iron oxide, barytes, litharge and the like.

The solid phase of a drilling mud consists of colloidal and non-colloidal particles. It is the colloidal particles which are responsible for the colloidal character of the drilling mud, and due to their presence drilling muds are essentially colloidal dispersions. An ideal drilling mud is a thixotropic colloidal system, that is to say, a fluid, which on agitation, as by pumping or otherwise, has a relatively low viscosity and is free-flowing, but when agitation is stopped gradually sets or gels. This gelling action is sufficiently slow to permit the cuttings to settle two or three feet before the gel structure which is developing during this time is strong enough to support them. For the purpose of convenience I intend that the term "thixotropic drilling mud" connote a drilling fluid having proper viscosity and the proper gel rate and gel strength. In use when such a drilling fluid is circulated through a well bore, it has sufficiently high viscosity to carry the cuttings and sand from the bottom of the hole to the surface, and it has a sufficiently slow gelling rate to allow the cuttings and sand to settle in a settling pit. On standing in a quiescent state it develops sufficient gel strength to prevent the settling of the cuttings, sand or barytes, etc., in the well bore itself when it becomes necessary to discontinue circulation for a period of time.

The use of a drilling mud which is non-thixotropic is attended by many disadvantages, all of which are well known to those skilled in the art of drilling wells. A non-thixotropic drilling mud is one which either develops no gel at all, or which flocculates rapidly enough to remain in a plastic state even while in motion. The former condition results in the settling of suspended solids to the bottom of the bore hole during periods of discontinued circulation. On the other hand, a drilling fluid which gels too rapidly is difficult to maintain free of cuttings and sand. Such a drilling mud of adequate viscosity at normal circulating rate easily becomes gas cut because of the recirculation of gas bubbles trapped by the rapid-forming gel or flocks. This is particularly dangerous in those cases where the bore hole traverses or encounters high gas pressures, because the gas cutting of the mud may so reduce the hydrostatic head of the drilling mud in the bore hole as to result in the blowing out of the well.

Drilling muds are generally prepared by suspending in water clays which will yield thixotropic colloidal systems. Such clays contain in varying amounts complex colloidal alumino-silicates which are essentially acids whose anion is a micell of the general formula,

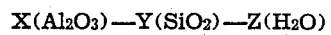

$$X(Al_2O_3) - Y(SiO_2) - Z(H_2O)$$

where X is approximately 1, Y is approximately 3, and Z may vary over wide values. In the interest of simplicity, this anion will be termed hereinafter as clay and the compounds formed by its combination with various cations will be termed clays of cations; so, for example, the hydrogen compound will be termed hydrogen clay, the sodium compounds will be termed sodium clays, while the calcium compounds will be called calcium clays.

It has been observed that dispersions in water of either acid clays or multivalent ion clays tend to gel rapidly, and are very sensitive to coagulation by dissolved salts or impurities. Obviously such type of dispersions are undesirable as drilling fluids since small amounts of soluble salts in the formations being drilled cause either too high gelling rate or actual flocculation. The alkali metal clays are more readily rendered thixotropic and require larger amounts of salts and impurities to cause rapid gelling and flocculation.

Although drilling fluids having satisfactory thixotropic properties may be prepared by the use of suitable clays, these desirable properties are lost in varying degrees during the penetration of certain shales, clays and water-bearing formations. This deterioration of thixotropic drilling muds may involve the conversion of monovalent ion clay into an acid clay or a multivalent ion clay. The former occurs when the thixotropic drilling mud encounters acid strata; the latter, which is the more common, occurs when the drilling mud encounters strata of calcium and magnesium clays or soluble compounds. Under such circumstances a phenomenon known as base exchange occurs whereby the monovalent ion clays are converted into multivalent ion clays, and are thereby rendered more sensitive to flocculating impurities.

Flocculation or coagulation of any of the types of clays by flocculating materials such as salt encountered during drilling and the rapid accumulation of colloidal matter from shales or clays penetrated increase both the viscosity of the drilling mud and its gel strength to undesirably high values. Dilution of the mud with water, which is frequently employed to remedy this condition, is particularly undesirable if high gas pressures are encountered, since the specific gravity of the fluid is thereby lowered and more gas permitted to enter the well bore.

I have discovered that certain new compositions of alkali metal with phosphorus, boron and oxygen, when added to a drilling mud, will counteract the flocculating effect of salts and impurities and the accumulation of excessive amounts of shales and clays, and consequently lower the viscosity and gel strength of the mud. The aforementioned compositions, together with their method of preparation, are fully disclosed in my copending patent application Serial No. 152,464, filed concurrently herewith. Briefly stated, these compositions are prepared by heating to effect fusion and dehydration, and then rapidly cooling the melt whereby water-soluble glasses consisting of combined alkali metal, phosphorus, boron and oxygen result. As described in the above mentioned patent application, I do not limit myself to the choice of exact amounts of ingredients but contemplate the use of glasses having a wide range of composition, including compositions in which the boric oxide content may range from about 1 per cent to about 68 per cent.

I have found that compositions containing 1 to 20% of combined boric oxide in water solution are particularly effective for the deflocculation of dispersions of clays in water. These compounds are also useful for the deflocculation of other inorganic materials, such, for example, as finely ground calcium carbonate and barium sulfate. I have observed particularly in the case of compositions prepared by fusing together borax and sodium dihydrogen orthophosphate that the compositions are more effective as defloccu-lants than sodium hexametaphosphate, and that the rates of rehydration of some of them were as low as one-half to one-third the rate of rehydration of sodium hexametaphosphate.

I have also found that the compositions containing 5% or more of boric oxide displayed subsequently no calcium- or magnesium-sequestering action in water solution, thus differing from sodium hexametaphosphate, which has a marked sequestering action. Even with those compositions containing less than 5% of boric oxide, the calcium- and magnesium-sequestering action is substantially less than that of sodium hexametaphosphate.

As specific illustrations of the products that may be prepared according to my invention, I give below several examples of varying composition. It is to be understood that by the term "fusion" I contemplate heating the reagents to a temperature in the neighborhood of 800 to 900° C. or above, at which temperature the reagents quickly fuse to glasses with a rapid evolution of water until the melt is substantially anhydrous and clear. When it is observed that no more water vapor is evolved, which point may be recognized by the cessation of bubbling, the melt is subjected to rapid cooling which I term "shock-chilling." I effect this rapid cooling by pouring the melt in thin layers, preferably from 3 to 4 mm. in thickness, upon water-chilled plates or revolving cylinders whereby the melt is brought to room temperature in very short time of the order of 1 to 3 minutes. The rate of temperature reduction therefore is in excess of 200° C. per minute. I do not intend to limit myself to the above method of cooling but contemplate the use of other methods whereby rapid or shock-chilling may be attained.

Example 1

A mixture of 6 mols of sodium dihydrogen orthophosphate was fused with 1 mol of borax, yielding a clear melt which was subsequently shock-chilled. The resultant glass had a molecular ratio of oxides as follows: $4Na_2O$, $3P_2O_5$, $2B_2O_3$.

Example 2

7 mols of sodium dihydrogen orthophosphate were fused with 1 mol of borax, yielding a melt which was subsequently shock-chilled. The resultant glass had a molecular ratio of oxides as follows: $9Na_2O$, $7P_2O_5$, $4B_2O_3$.

Example 3

8 mols of sodium dihydrogen orthophosphate were fused with 1 mol of borax, yielding a melt which was subsequently shock-chilled. The resultant glass had a molecular ratio of oxides as follows: $5Na_2O$, $4P_2O_5$, $2B_2O_3$.

Example 4

12 mols of sodium monometaphosphate were fused with 1 mol of borax, yielding a melt which was subsequently shock-chilled. The resultant glass had a molecular ratio of oxides as follows: $7Na_2O$, $6P_2O_5$, $2B_2O_3$.

Example 5

24 mols of sodium monometaphosphate were fused with 1 mol of borax, yielding a melt which was subsequently shock-chilled. The resultant glass had a molecular ratio of oxides as follows: $13Na_2O$, $12P_2O_5$, $2B_2O_3$.

Example 6

5 mols of sodium dihydrogen orthophosphate were fused with 1 mol of borax, yielding a melt which was subsequently shock-chilled. The resultant glass had a molecular ratio of oxides as follows: $7Na_2O$, $5P_2O_5$, $4B_2O_3$.

Example 7

2 mols of sodium hexametaphosphate were fused with 3 mols of borax, yielding a melt which was subsequently shock-chilled. The resultant glass had a molecular ratio of oxides as follows: $3Na_2O$, $2P_2O_5$, $2B_2O_3$.

Example 8

4 mols of sodium dihydrogen orthophosphate were fused with 1 mol of borax, yielding a melt which was subsequently shock-chilled. The resultant glass had a molecular ratio of oxides as follows: $3Na_2O, 2P_2O_5, 2B_2O_3$.

This example taken with Example 7 illustrates that it is possible to duplicate the compounds which I have discovered by the fusion of different sodium-, phosphorus-, boron- and oxygen-containing compounds. The same composition as that described in Example 8 may be obtained by the fusion of 3 mols of sodium oxide, 2 mols of phosphorus pentoxide, and 2 mols of boric oxide.

Example 9

1 mol of sodium hexametaphosphate was fused with 2 mols of borax, yielding a melt which was subsequently shock-chilled. The resultant glass had a molecular ratio of oxides as follows: $5Na_2O, 3P_2O_5, 4B_2O_3$.

Example 10

4 mols of sodium dihydrogen orthophosphate were fused with 1 mol of borax and 1 mol of boric oxide, yielding a melt which was subsequently shock-chilled. The resultant glass had a molecular ratio of oxides as follows: $3Na_2O, 2P_2O_5, 3B_2O_3$.

Example 11

4 mols of sodium dihydrogen orthophosphate were fused with 1 mol of borax and 2 mols of boric oxide, yielding a melt which was subsequently shock-chilled. The resultant glass had a molecular ratio of oxides as follows: $3Na_2O, 2P_2O_5, 4B_2O_3$.

Example 12

1 mol of sodium hexametaphosphate was fused with 4 mols of borax, yielding a melt which was subsequently shock-chilled. The resultant glass had a molecular ratio of oxides as follows: $7Na_2O, 3P_2O_5, 8B_2O_3$.

Example 13

2 mols of sodium dihydrogen orthophosphate were fused with 1 mol of boric oxide, yielding a melt which was subsequently shock-chilled. The resultant glass had a molecular ratio of oxides as follows: $1Na_2O, 1P_2O_5, 1B_2O_3$.

Example 14

2 mols of sodium dihydrogen orthophosphate were fused with 2 mols of disodium orthophosphate and 1 mol of borax, yielding a melt which was subsequently shock-chilled. The resultant glass had a molecular ratio of oxides as follows: $2Na_2O, 1P_2O_5, 1B_2O_3$.

1 mol of sodium metaphosphate may be fused with 1 mol of sodium metaborate to obtain a glass having the same composition.

In using the designations of the oxides of Na, P and B in the specification and claims it is not to be understood that these oxides are present as such in the products of the melts. The use of these designations is merely for the sake of convenience in expressing the proportions of the elements present, in accordance with the common practice employed in reporting compositions of heterogeneous inorganic masses, such as glass, commercial sodium silicate, and the like.

As an example of the effectiveness of my compositions for treating drilling muds, I give in graph form on the accompanying drawing the deflocculating effects observed on treating a drilling mud consisting essentially of a water suspension of a shale obtained in the Manvel field in south Texas. In the diagram, the viscosities are expressed as centipoises and were obtained by measuring the drilling muds on the Stormer viscosimeter at 600 revolutions per minute. From a consideration of the diagram, it will be observed that the original drilling mud had a viscosity of 57 centipoises. Treatment of a sample of this drilling mud with sodium hexametaphosphate in the ratio of approximately 0.02 gram per 100 cubic centimeters of the drilling mud reduced the viscosity of the drilling mud to approximately 30 centipoises. Other samples of the suspension were treated with boria-containing compositions made according to my invention, and these showed a marked increase in viscosity-reducing effect as compared with sodium hexametaphosphate up to compositions containing about 20% of boria. Compositions containing more than about 20% of boria also exhibited marked viscosity-reducing effects, although in gradually decreasing amount with the increase in boria content.

The amounts of the compositions discovered by me necessary to practice my invention depend upon numerous factors, such as the type of drilling mud to be treated, the amount of improvement or the degree of protection that is desired in the drilling mud, as well as the conditions of use. Those skilled in the art will appreciate that in view of the foregoing it is impossible to set any specific limitations as to the amounts of the alkali metal, phosphorus, boron and oxygen compounds necessary, and although I have found that 0.001% to 0.1% by weight of the compositions will usually be sufficient, I do not intend to limit myself to that range but contemplate the use of the compositions in amounts sufficient to effect the deflocculation or viscosity reduction that is required.

Although I have described the use of the sodium derivatives, I do not intend to limit myself to that series of compositions alone, but contemplate the use of compounds of any of the alkali metals.

My invention may be carried out in several different ways. For example, I may prepare a drilling mud by incorporating the desired amount of one of the compositions discovered by me directly in a suspension of clay and water, or I may add the necessary amount of one of my compositions to a drilling mud which has flocculated in order to reduce it to a value at which the drilling mud can be effectively used. I also contemplate the continuous addition of a solution of one of my compositions to a drilling mud during use to prevent any substantial change in its colloidal and physical characteristics.

It is intended that the word "clay" as used herein shall include bentonite clays containing appreciable quantities of bentonite, as well as those clays which display the properties of deflocculating in water. I also intend that the term "finely divided solids" shall include both clays and all other finely divided water-soluble solids, including materials such as iron oxide, barytes, litharge and the like, or any mixtures thereof.

Obviously many modifications and variations of the invention as hereinbefore set forth may be made without departing from the spirit and scope thereof and only such limitations should be imposed as are indicated in the appended claims.

I claim:

1. A drilling mud comprising a dispersion of clay in an aqueous solution of a water soluble anhydrous composition in the form of a rapidly chilled melt comprising an alkali metal oxide, $P_2O_5$ and $B_2O_3$, and in which composition both P and B are present in appreciable amount and the alkali metal is present in an amount not to exceed the atomic equivalent of the sum of the atomic proportions of P and B and not less than one-half the equivalent of this sum, the $B_2O_3$ content of the rapidly chilled melt being within the range of 1% to 20% by weight.

2. In the art of drilling and controlling wells in which mud is circulated in the bore hole, the process comprising treating the mud with a water soluble anhydrous composition in the form of a rapidly chilled melt comprising $Na_2O$, $P_2O_5$ and $B_2O_3$, and in which composition both P and B are present in substantial amount and sodium is present in an amount not to exceed the atomic equivalent of the sum of the atomic proportions of P and B and not less than one-half the equivalent of this sum, the $B_2O_3$ content of the rapidly chilled melt being within the range of about 1% to 20% by weight.

3. The process according to claim 2 in which said composition is added in amounts from 0.001 to 0.1% by weight.

4. A method of treating an aqueous suspension of clay which comprises adding thereto a water soluble anhydrous composition in the form of a shock-chilled melt comprising an alkali metal oxide, $P_2O_5$ and $B_2O_3$ and in which composition both P and B are present in appreciable amount and the alkali metal is present in an amount not to exceed the atomic equivalent of the sum of the atomic proportions of P and B and not less than one-half the equivalent of this sum, the $B_2O_3$ content of the shock-chilled melt being within the range of about 1% to 20% by weight.

5. A drilling mud comprising an aqueous dispersion of clay containing a small but viscosity reducing proportion of an added water soluble glass comprising an alkali metal phosphate homogeneously associated with a compound of boron by fusion of the two followed by shock-chilling, the glass containing about 1% to 20% of $B_2O_3$ by weight.

6. In the art of drilling and controlling wells in which mud is circulated in the bore hole of a well, the process of controlling the viscosity and other desirable properties of the circulating mud which comprises adding thereto a small proportion of a water soluble glass comprising an alkali metal phosphate homogeneously associated with a compound of boron by fusion followed by shock-chilling, the glass containing about 1% to 20% $B_2O_3$ by weight.

7. A drilling mud in accordance with claim 5, in which the $B_2O_3$ content of the shock-chilled melt is within the range of about 1% to 9.75% by weight.

8. The process according to claim 6, in which the water soluble anhydrous composition contains about 1% to 9.75% $B_2O_3$ by weight.

9. The method of improving a drilling mud which comprises adding thereto a water-soluble glass containing in compounded form an alkali metal oxide, $P_2O_5$ and $B_2O_3$.

10. A drilling mud comprising an aqueous dispersion of clay containing an added water-soluble glass containing in compounded form an alkali metal oxide, $P_2O_5$ and $B_2O_3$.

11. The method of improving a drilling mud which comprises adding thereto a water-soluble glass comprising a shock-chilled melt of sodium dihydrogen orthophosphate, disodium orthophosphate and an oxygen-containing compound of boron.

12. A drilling mud comprising an aqueous dispersion of clay containing an added water-soluble glass comprising a shock-chilled melt of sodium dihydrogen orthophosphate, disodium orthophosphate and an oxygen-containing compound of boron.

13. The method of improving a drilling mud which comprises adding thereto a water soluble glass comprising an alkali metal phosphate homogeneously associated with an oxygen-containing compound of boron.

14. The method of improving a drilling mud which comprises adding thereto a water soluble glass comprising an alkali metal hexametaphosphate homogeneously associated with an oxygen-containing compound of boron.

15. A drilling mud comprising an aqueous dispersion of clay containing an added water soluble glass comprising an alkali metal phosphate homogeneously associated with an oxygen containing compound of boron.

16. A drilling mud comprising an aqueous dispersion of clay containing an added water soluble glass comprising an alkali metal hexametaphosphate homogeneously associated with an oxygen containing compound of boron.

17. A method of improving a drilling mud which comprises adding thereto a water soluble glass resulting from the fusing of an alkali metal hexametaphosphate with an oxygen containing compound of boron, and rapidly chilling the melt.

ALLEN D. GARRISON.